United States Patent
Kim et al.

[19]

[11] Patent Number: 5,961,647
[45] Date of Patent: Oct. 5, 1999

[54] APPARATUS AND METHOD FOR CONTROLLING POWER SUPPLY FOR USE WITH COMPUTER PERIPHERAL DEVICE

[75] Inventors: Gee-Don Kim, Kyungki-do; Ji-Young Lee, Seoul; Bong-Hyun Park, Kyungki-do, all of Rep. of Korea

[73] Assignee: SamSung Electronics Co., Ltd., Kyungki-do, Rep. of Korea

[21] Appl. No.: 08/759,623

[22] Filed: Dec. 5, 1996

[30] Foreign Application Priority Data

| Dec. 5, 1995 | [KR] | Rep. of Korea | 95-46725 |
| Dec. 28, 1995 | [KR] | Rep. of Korea | 95-62479 |
| Nov. 14, 1996 | [KR] | Rep. of Korea | 96-54691 |

[51] Int. Cl.$^6$ ....................................................... G06F 1/00
[52] U.S. Cl. ........................................... 713/300; 713/320
[58] Field of Search ................... 395/750.03, 750.07, 395/750.05, 750.06; 364/492, 483; 713/300, 320, 310, 321, 323, 324

[56] References Cited

U.S. PATENT DOCUMENTS

| 5,335,168 | 8/1994 | Walker | 364/707 |
| 5,359,540 | 10/1994 | Ortiz | 364/492 |
| 5,375,245 | 12/1994 | Solhjell et al. | 395/750.03 |
| 5,389,952 | 2/1995 | Kikinis | 345/212 |
| 5,481,732 | 1/1996 | Shahbazi | 395/728 |
| 5,483,464 | 1/1996 | Song | 364/492 |
| 5,603,040 | 2/1997 | Frager et al. | 395/750.05 |
| 5,696,978 | 12/1997 | Nishikawa | 395/750.06 |

*Primary Examiner*—Ayaz R. Sheikh
*Assistant Examiner*—Xuonk M. Chung-Trans
*Attorney, Agent, or Firm*—Robert E. Bushnell, Esq.

[57] ABSTRACT

A method and circuit for controlling power supply for use with a monitor is disclosed. Without using separate switching device, the circuit utilizes a microcomputer in performing switching operation for supplying power. The circuit includes a control signal generating circuit disposed to receive a signal input from the computer system and to generate a corresponding control signal at its output terminal in dependence upon individual signal input; and a switching circuit for electrically switching power supply being applied responsive to the control signal. The method includes the steps of receiving a signal produced from the computer system via a signal cable at an input terminal of the monitor, the signal being subject to individual state of display power management system employed in the computer system', and generating a control signal corresponding to the signal from an output terminal of a microcomputer to an input terminal of a switching circuit. By eliminating manually operated switching device, aesthetic visual appearance of a monitor is enhanced, allowing manufacturing process more simplified thereby enhancing productivity at a low cost.

15 Claims, 6 Drawing Sheets

APPARATUS AND METHOD FOR CONTROLLING POWER SUPPLY FOR USE WITH COMPUTER PERIPHERAL DEVICE

CLAIMS OF PRIORITIES

This application makes reference to, incorporates the same herein, and claims all benefit accruing under 35 U.S.C. §119 from patent applications for APPARATUS AND METHOD FOR CONTROLLING POWER SUPPLY FOR USE WITH A MONITOR filed in the Korean Industrial Property Office on the Dec. 5, 1995 and assigned Ser. No. 40725/1995, CIRCUIT AND METHOD FOR CONTROLLING POWER SUPPLY FOR USE WITH A MONITOR filed in the Korean Industrial Property Office on the Dec. 28, 1995 and assigned Ser. No. 62179/1995, and APPARATUS AND METHOD FOR CONTROLLING POWER SUPPLY FOR USE WITH COMPUTER PERIPHERAL DEVICE earlier filed in the Korean Industrial Property Office on the Nov. 16, 1996 and there duly assigned Ser. No. 54691/1998, respectively,

FIELD OF THE INVENTION

The present invention generally relates to a power supply control circuit, and more particularly, relates to power control method and apparatus for use with a computer peripheral device capable of automatically performing power switching operation in dependence upon power ON/OFF control for a computer system without using a separate power supply switch.

BACKGROUND OF THE INVENTION

As is well known in the art, contemporary practice typically employs a power supply control apparatus for a computer system having three portions, that is a main body, a display apparatus and cable lines that are used for transmission of a display signal including a video signal and a synchronizing signal and for establishing electrical conduction path between the main body and display apparatus. Another exemplar of a power supply apparatus of a computer system provides for a display apparatus that is not powered directly from an external power source, but rather from a power supply in main body portion of a computer system.

As previously noted, conventional power supply circuit is designed to save power consumption required for a proper operation of various circuits to some extent when power consumption is shifted to a power saving mode under the control of display power management system (DPMS). It is observed however that even in a power saving mode, constant level of power consumption is still kept so as to continuously support a heater operation and to supplement a leakage current. This is an inherent drawback to the above described power supply circuit.

In addition, repeated switching operation of a power supply switching device in normal conditions can cause wear and tear as well as contact noise. Such drawbacks as described cause product efficiency to drop in a mass production environment, increasing overall production of a display apparatus Further, the manufacturers must undertake the inconvenience of additional manufacturing steps to produce a manually operated power supply switching device. Additionally, an additional switching device may detract aesthetic visual appearance from a display apparatus.

Earlier monitor driving devices include a power supply source for supplying power to a computer, a computer circuit operated by the power supply source for outputting a video control signal for operating a corresponding device, and a monitor operated in response to the video control signal from the computer circuit. The power supply source includes a computer power supply for supplying the power to the computer circuit and a monitor power supply for supplying power to the monitor in response to a monitor power control signal on the computer circuit.

The monitor includes a monitor circuit operated in response to the power supply from the monitor power supply and the video control signal from the computer circuit, a cathode ray tube (CRT) receiving the power from the monitor power supply and operated in response to a cathode ray tube control signal from the monitor circuit. When power is supplied to the power supply, the monitor power supply supplies the power to the monitor circuit and the cathode ray tube. The computer power supply supplies the power for operating the computer circuit. When a video control signal is input to the monitor circuit from the computer circuit, the monitor circuit outputs a cathode ray tube control signal to the cathode ray tube and is operated in the video image signal corresponding to the video control signal from the computer circuit.

In the earlier designs for a monitor driving device, the power consumption by the monitor can be reduced by the monitor power control signal from the computer circuit. The computer circuit outputs a monitor power control signal at a low level to the monitor power supply to reduce the power consumption by the monitor. The monitor power supply cuts off the power to the monitor circuit and the CRT, thereby reducing the power consumption while the monitor is not being used. The monitor control signal at high level is from the computer circuit to the monitor power supply to use the monitor again by operating the monitor circuit and the cathode ray tube in which the power was previously cut off. I have found however, the earlier monitor driving device has a disadvantage in that it takes too much time to display an image on the screen of the cathode ray tube due to the heating time of the cathode ray tube when the monitor driving device is turned off by the monitor power control signal and again turned on by the monitor power control signal at the high level after passing a predetermined time. I have also noticed that the earlier monitor driving device has another disadvantage in that the life span of the cathode ray tube is reduced when the voltage is continuously applied to the cathode ray tube to preheat the cathode ray tube.

Recent efforts in the art such as the patent to Song, U.S. Pat. No. 5,483,464, entitled *Power Saving Apparatus For Use In Peripheral Equipment Of A Computer*, is but one example of an apparatus for turning off peripheral equipment (such as a monitor) in a computer apparatus to save power in a stand-by state. Walker patent, U.S. Pat. No. 5,335,168 entitled *Computer System With Power-Down Mode For Monitor*, endeavours to conserve power by powering down the monitor much in the fashion noted above. In addition, a diode is utilized to supply a voltage lower than normal voltage to the filament 40 of the cathode ray tube to decrease the period of the time needed for the cathode ray tube to again be operated after being in a stand-by state. I have observed that the efforts in the art represented by Walker '168 however, seem to lack the ability to directly supply the power for the lower voltage generated from the computer power supply. Such an interval for warming up a heater may even deteriorate an image representation on the screen of a cathode ray tube (CRT).

In a typical exemplar of contemporary practice for supplying power to a monitor associated with a computer system, a power supply circuit includes a rectifier for rectifying supplied alternating current power and for generating a rectified direct current source voltage, a first power generator for receiving a direct current from the rectifier and for generating power in a switching mode power supply SMPS mode, a first power supply supplied with power from the first power generator for supplying power to various circuits in a monitor, a second power generator fed with direct current from the rectifier for generating power in a switching mode power supply mode, and a second power supply supplied with power from the second power generator for generating power for use by a computer system. The rectifier is supplied from a commercially available external power source with alternating current AC (110 Volts/220 Volts), rectifying and smoothing the supplied power by using a combination of a diode and capacitor, generating rectified power at a constant voltage level of direct current. The first power generator is supplied with a direct current and generates power in a switching mode power supply SMPS mode. The first power supply is supplied with power from the first power generator and supplies power at different voltage levels so as to energize various circuits in a monitor. The second power generator is supplied with direct current from the rectifier and generates power in a switching mode power supply mode. The second power supply is supplied with power from second power generator and supplies power at different voltage levels so as to energize various circuits in a computer system. When an operation of a computer system is suspended for a predetermined time interval, the first power generator supplies no power to the first power supply upon receiving a power saving signal output from a microcomputer (not shown). A switching mode power supply SMPS mode is well known in the art so that no further explanation will be provided. Upon observation of contemporary art as previously described, there is found drawbacks as mentioned above.

SUMMARY OF THE INVENTION

Accordingly, it is an object of the present invention to provide an improved power supply control circuit.

Another object of the present invention is to provide an improved power supply control method and apparatus for use with a computer peripheral device capable of automatically performing power switching operation.

Another object of the present invention is to provide an improved power control method and apparatus for use with a computer peripheral device capable of automatically performing power switching operation, in dependence upon power ON and OFF control for a computer system without using a separate power supply switch.

Accordingly, it is an object of the present invention to provide method and apparatus for controlling power supply for use with a display apparatus in a computer system.

It is another object to provide power supply control circuit and method for use with a computer system driving a video monitor.

It is still another object to provide method and circuit for controlling power supply for use in a monitor by utilizing a microcomputer generating a power supply control signal.

It is yet another object to provide circuit and method for utilizing a microcomputer that generates a power supply control signal to control power supply in a monitor utilizing a switching device mechanically affixed to and provided in a monitor.

It is yet still another object of the present invention to provide circuit and method for controlling power supply for use in a monitor, in which a microcomputer generating a control signal in response to a signal input from a computer system is electrically connected to a power circuit so as to perform switching operation thereby eliminating the use of a mechanical switching device in a monitor.

It is also another object of the present invention to provide control circuit and method for power supplying management in a power saving mode for a monitor, capable of efficiently reducing power consumption by cutting off a power supply to electronic components other than a microcomputer generating a control signal for the monitor.

It is also yet another object of the present invention to provide control circuit and method for turning on and off a monitor without using a switching device mechanically provided on an external surface of the monitor, thereby enhancing aesthetic visual appearance and product efficiency, at a low cost.

To achieve these and other objects of the present invention, there is provided a power control circuit in a peripheral device for use with a computer system associated therewith. The power control circuit includes a control signal generator for producing a control signal input from the computer system and a switching circuit for performing a switching operation so as to enable, or disable, an electrical conduction path of current flow, responsive to the control signal input.

In addition, the method for controlling power supply for use with a monitor incorporating a microcomputer is achieved by turning on a power circuit in the monitor responsive to a signal output from the microcomputer when a signal input from a computer system exhibits a turn-on state; turning off power supply to overall circuits in the monitor excluding the microcomputer which maintains a stand-by state upon shifting of a normal operation into a power saving operational mode in the computer system; producing a turn-on signal so as to shift an operational mode of a monitor into a normal mode state upon applying a power saving mode release signal input from the computer system to an input terminal of the microcomputer; and shutting down power supply to the power circuit in the monitor when the computer system is powered off.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENT

Figure 1:
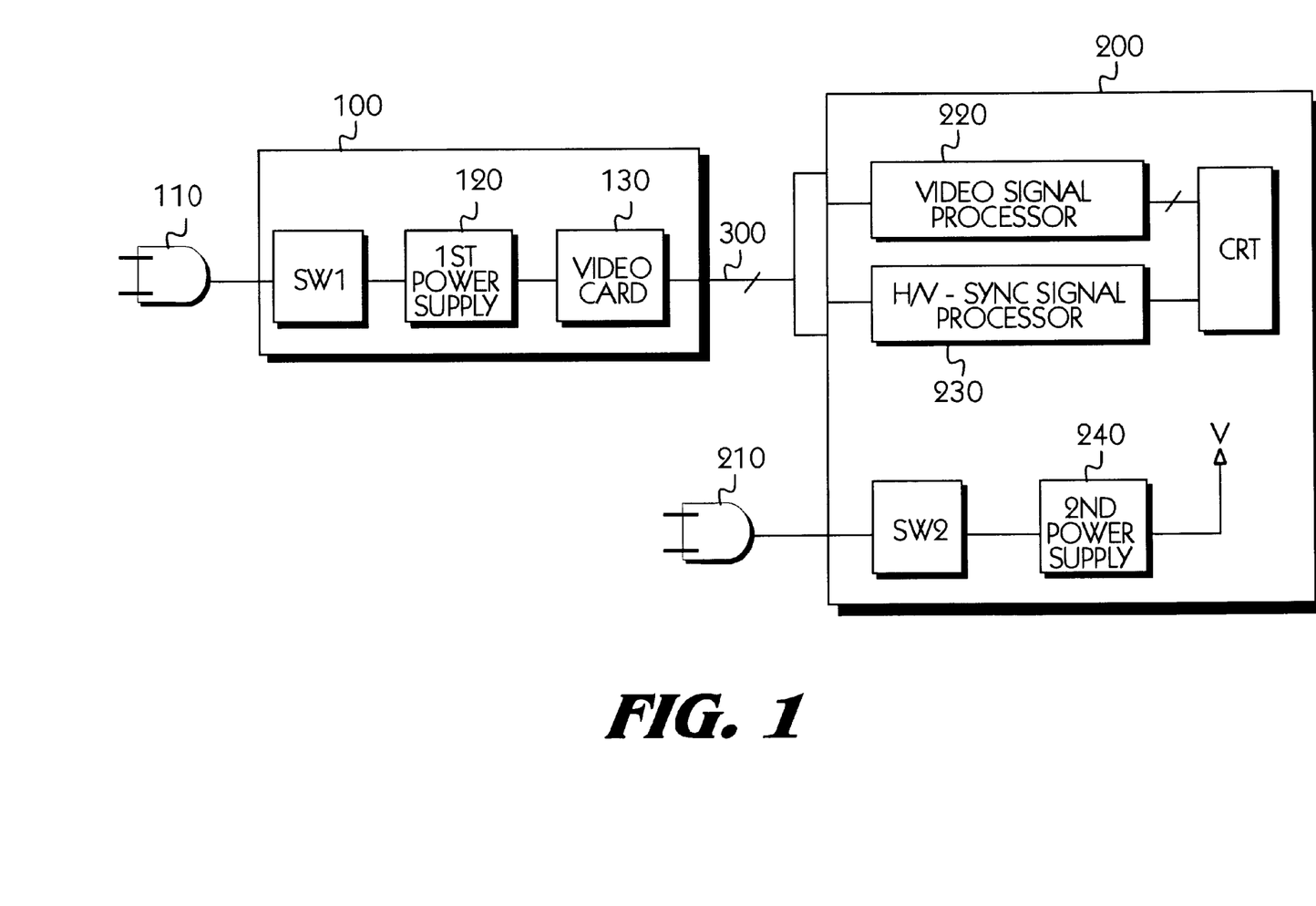
FIG. 1 is a schematic block diagram of a power supply control apparatus of a computer system constructed according to an exemplar of contemporary practice.

Turning now to the drawings, a contemporary practice typically employs a power supply control apparatus for a computer system having a constructed configuration as illustrated in FIG. 1. An exemplar of a construction of a contemporary practice is generally divided into three portions. i.e., a main body 100, a display apparatus 200 and cable lines 300 that are used for transmission of a display signal including a video signal and a synchronizing signal and for establishing electrical conduction path between the main body and display apparatus.

The main body 100 of a computer system is connected to a main power source via a power supply cable line 110 having a male contact at its end portion. The main body 100 includes a switching device SW1 for switching power transmission via power supply cable line 110, a first power supply 120 for controlling a power supply to overall portion of whole system according to ON/OFF operation of switching device SW1, and a video card 130 for providing both a video signal and a synchronizing signal Sync such that a pictorial image can be visually displayed on the screen of a display apparatus 200 in the form of both characters and graphics for user recognition, responsive to an operation of a computer system.

Display apparatus 200 is directly connected to a main power supply via a power supply cable line 200 having a male contact at an end portion thereof. The display apparatus 200 includes a second power supply 240 for providing various circuits connected thereto with a power supply transmitted via power supply cable line 200 when a switching device SM is turned on. A video signal processor 220 is disposed to receive a video signal transmitted via cable lines 300 from video card 130 of main body 100 so as to provide a visually display of a video signal on the screen of a cathode ray tube CRT.

Horizontal/Vertical synchronizing signal processor 230 is arranged to receive a synchronizing signal transmitted mixed with any one signal among video components Red, Green and Blue, for example, Sync On Green signal or directly transmitted via an electrical path of cable lines 300 so as to provide a visually display of a picture signal on the screen of a cathode ray tube. A conventional computer system of such a construction typically transmits a video signal comprising red, green and blue components and horizontal/vertical vertical synchronizing signals via cable lines to a display apparatus 200 from a video card 130 so as to provide a variable visual display of an image on the display apparatus 200 by performing ON/OFF switching operation of power supply input via an alternating current AC power supply cable from a main its own power source cable performs a switching operation of a power supply.

Figure 2:
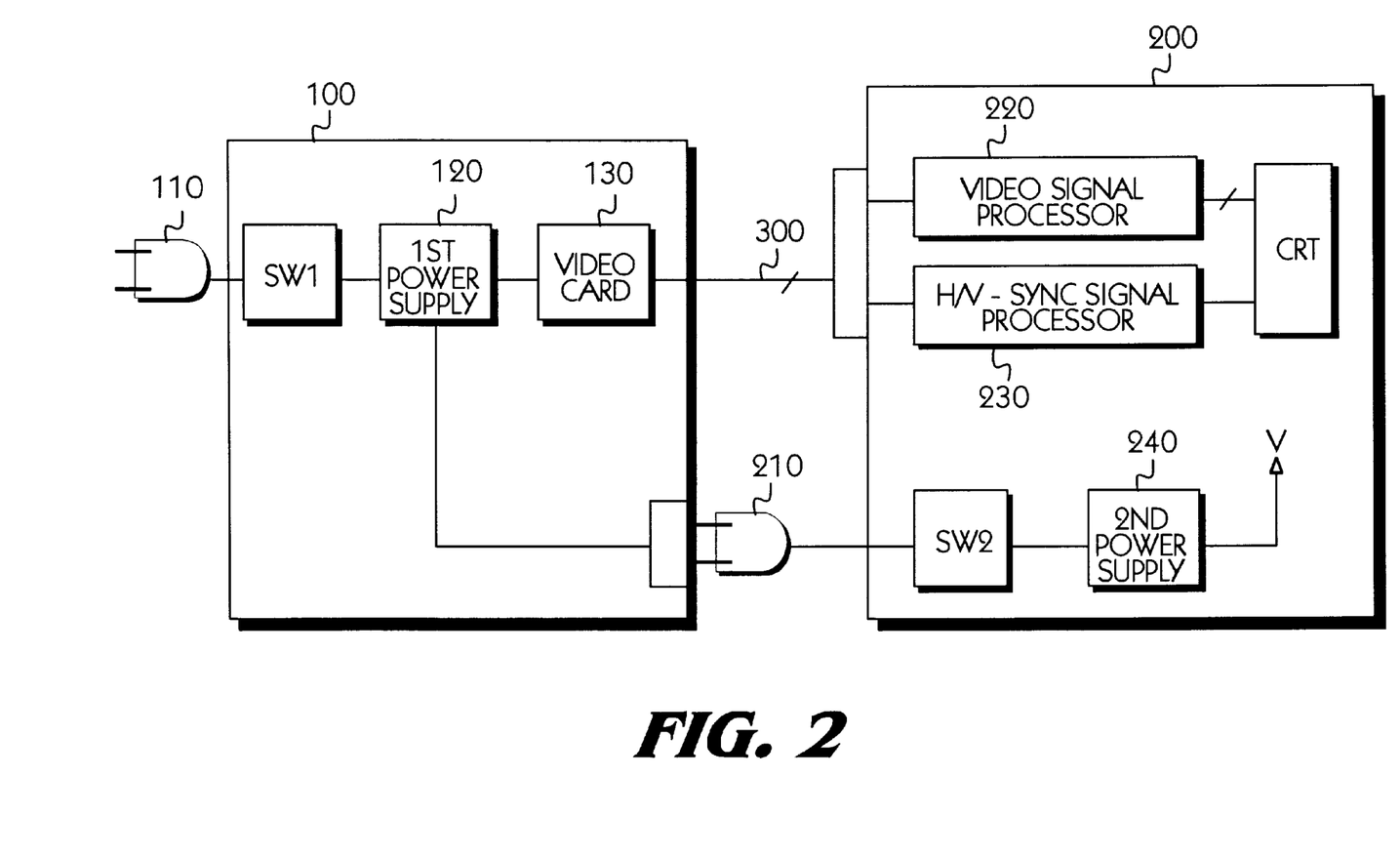
FIG. 2 is a schematic block diagram of a power supply control apparatus of a computer system constructed according to another exemplar of contemporary practice.

Another exemplar of a power supply apparatus of a computer system constructed according to a contemporary practice is illustrated in FIG. 2. The configuration is are roughly similar to exemplars as illustrated in FIG. 1. It makes however a difference that in FIG. 2, a power supply provided for a display apparatus is not transmitted directly from an external power source, but rather from first power supply in main body of a computer system.

Overall operations for both main body portion of a computer system or a display apparatus are not affected by such a configuration as depicted in FIG. 2. However, in this exemplar, a switching device SW1 provided in the main body collectively performs an ON/OFF switching operation for supplying a power transmission.

Usually, switching devices SW1 and SW2 respectively provided in a display apparatus and main body of a computer system are subjected to ON/OFF operations for use. The contemporary practice in the art is to allow a switching device SW1 in the main body be subjected to an ON/OFF operation, while allowing a switching device SW2 in a display apparatus to keep on state.

When powered on, power is supplied not only to various circuit in the main body of a computer system from first power supply, but also to second power supply 240 via power source cable 210 connected to first power supply via an electrical conduction path.

Figure 3:
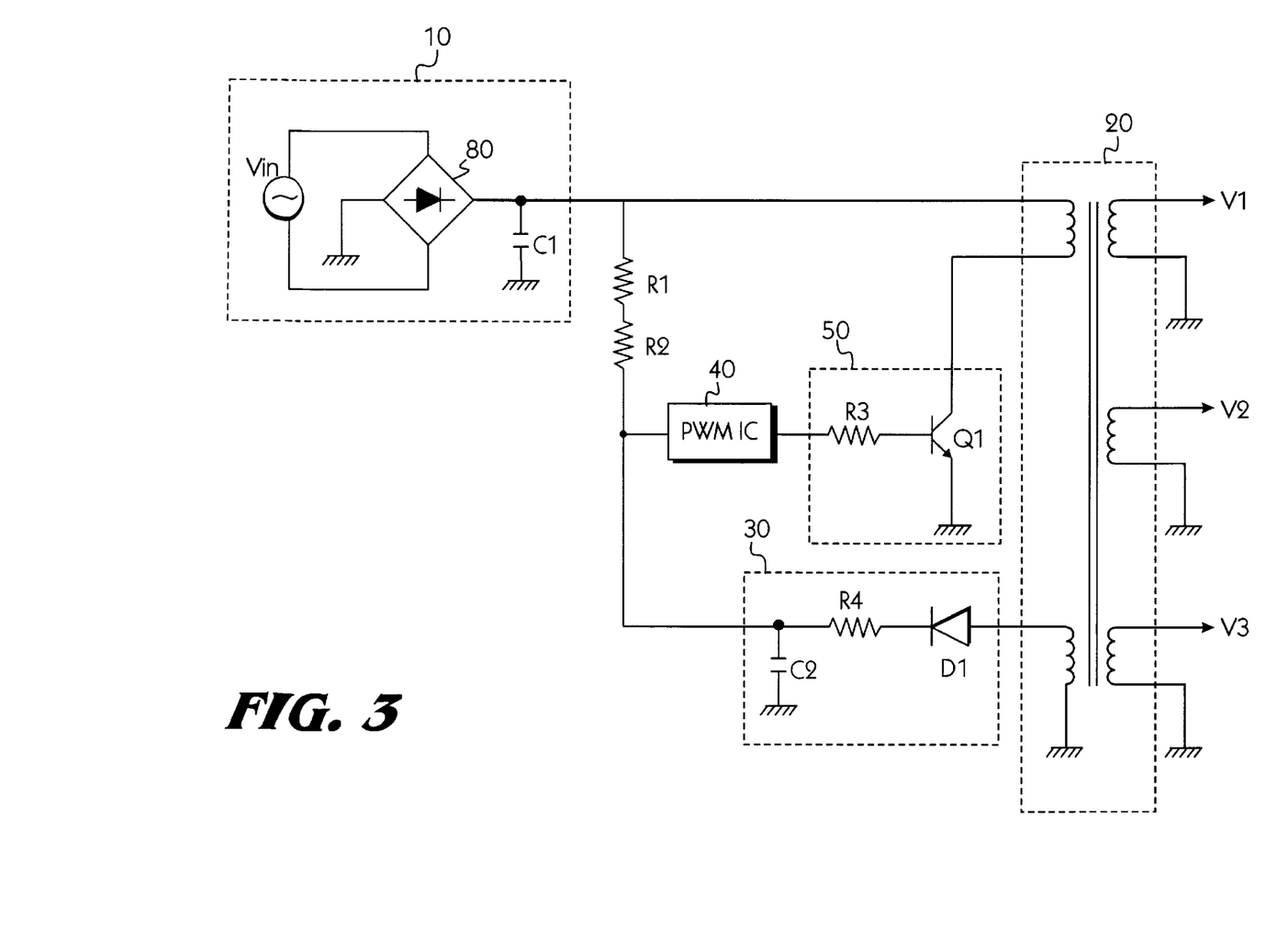
FIG. 3 is a detailed circuit diagram of power circuit employed in a monitor of a contemporary practice.

A detailed circuit diagram of second power supply 240 as shown in both FIGS. 1 and 2 is illustrated in FIG. 3. Rectifier circuit 10 comprises a bridge-type rectifier BD and a capacitor C1, so as to rectify alternation current AC voltage Vin supplied via power supply terminals. A voltage rectified by rectifier circuit 1 and applied at the junction nodes between bridge-type rectifier BD and capacitor C-1 is applied to an input terminal of first primary winding of power switching transformer 20 disposed for inducing a voltage power supply across respective output terminals of a plurality of secondary windings of transformer 20. A switching circuit 60 comprises a transformer switching transistor 01 for switching transformer 20 and a resistor R3 disposed for signal detection.

A pulse width modulation integrated circuit 40 PWM-IC is disposed to control a switching signal for transformer switching transistor 01 and is connected between terminal leads of resistor R2 and resistor R3. A driving circuit 30 is connected between an output terminal of second primary windings and a junction node between resistor R2 and pulse width modulation integrated circuit PWM-IC 40, so as to supply a voltage induced by transformer 20 to an input terminal of pulse width modulation integrated circuit PWM-IC 40 thereby ensuring continuous operation for stable signal generation. Driving circuit 30 comprises a diode 131 disposed to rectify a voltage induced by transformer 20, a resistor R4 for signal detection and a smoothing capacitor C2.

In a power supply circuit as described above, alternating current AC power supply Vin applied at input terminals is rectified by rectifier circuit 10, and then applied to an input terminal of first primary windings of transformer 20. A voltage supply rectified is voltage-dropped by serially connected resistors RI and RZ and is applied to a driving voltage input terminal Vcc of pulse width modulation integrated circuit PWM-IC 40 so as to enable an operational function thereof. When enabled, a signal output at an oscillation output terminal of pulse width modulation integrated circuit 40 is applied to an input arm of resistor R3. Upon applying a signal as described above to a base electrode of transformer switching transistor 01 via resistor R3, the transistor is turned on, establishing an electrical conduction path between an output terminal of first primary windings and ground potential thereby allowing current flow in the turns of first primary windings. As a result, a voltage is induced across a plurality of secondary windings. The voltage induced and applied at respective output terminals V1 V2 and V3 are used as voltage supply for an anode, focus and screen in a cathode ray tube.

A voltage induced by one of secondary windings across second primary windings is rectified by a diode Di, and is then smoothed by capacitor C2 across resistor R4 serially connected therebetween. Then a voltage rectified and smoothed is applied to an input terminal of pulse width modulation integrated circuit PWM-IC 40 so as to allow a stable signal generating operation be continuously performed.

As previously noted, a monitor power circuit is designed to save power consumption required for a proper operation of various circuits to some extent when power consumption is shifted to a power saving mode under the control of display power management system DPMS. It is observed however that even in a power saving mode, constant level of power consumption is still kept so as to continuously support a heater operation and to supplement a leakage current. This is an inherent drawback to the above described power circuit.

A monitor as commonly used as a display apparatus of a computer system, is a device disposed to receive signal inputs from the computer system, converting input signals into a video signal and to visually display an image on the screen. Thus an operation of a monitor is subject to the usage of a computer system. A monitor is to receive and provide a visual display of signal inputs from a computer system via transmission cables. Upon applying no signal input from a computer system, a monitor has no choice but to idle.

As a result, the above subordinate operational relationship between a computer system and a monitor requires a user to undertake the inconvenience of collectively turning on and off respective power switching operations for both apparatus and system which is cumbersome. When power supply is cut off in a computer system, then the screen of a monitor associated with the system fades out, resulting in a visually black screen as if power failure has occurred.

This phenomenon often produce illusions in a user's mind that a monitor be powered off. However, in many cases, contemporary practice in the art adopts a light emitting diode LED at one lower side portion of a front panel of a monitor to exhibit a power status and to alert the monitor in use. However, the size of a light emitting diode LED often fails to alert a user that a monitor is in use. These circumstances often give a user an impression that the monitor not in use, leading to waste of energy, and shortening the expected life span of a monitor.

Turning now on to drawings, and as illustrated in FIGS. 1 and 2, a pair of switching device SW1 and SW2 are generally affixed to a printed circuit board (PCB) by soldering. If a power supply switching device is arranged to be located substantially adjacent to a knob provided on a front panel of a computer case, a switching operation is performed by simply pushing the knob. If arranged at a location spaced away from the knob, a switching operation is to he performed by utilizing an intermediate guide in between the knob and a power supply switch. This arrangement as described above requires a power supply switch to maintain an effective operation position with respect to a knob so as to secure a proper operation. Namely, a mechanically accurate operating distance between a knob and power supply switch read to be kept. However, an observation on exemplars of the contemporary art in the field of power supply switching devices revealed that each of the above explained exemplars have drawbacks.

First, a deformation of knob injection molding may cause a variation in the length of a knob thereby causing a malfunction of switching operation. Second, a coupling error between a knob and a printed circuit board on which a switching device is installed causes a possible malfunction. Third, an intermediate guide actuator employed for transferring a switching operation between a knob and spaced-apart switching device may be deformed in length, resulting in a failure. In addition, repeated switching operation of a switching device and a knob in normal conditions can cause wear and tear as well as contact noise. Such drawbacks as described above cause product efficiency to drop in a mass manufacturing environment, increasing overall production cost of a display apparatus. Further, the drawbacks require manufacturers to undertake the inconvenience of additional manufacturing steps to produce a manually operated process supply switching device. Additionally, an additional switching device may detract aesthetic visual appearance from a display apparatus.

Figure 4:
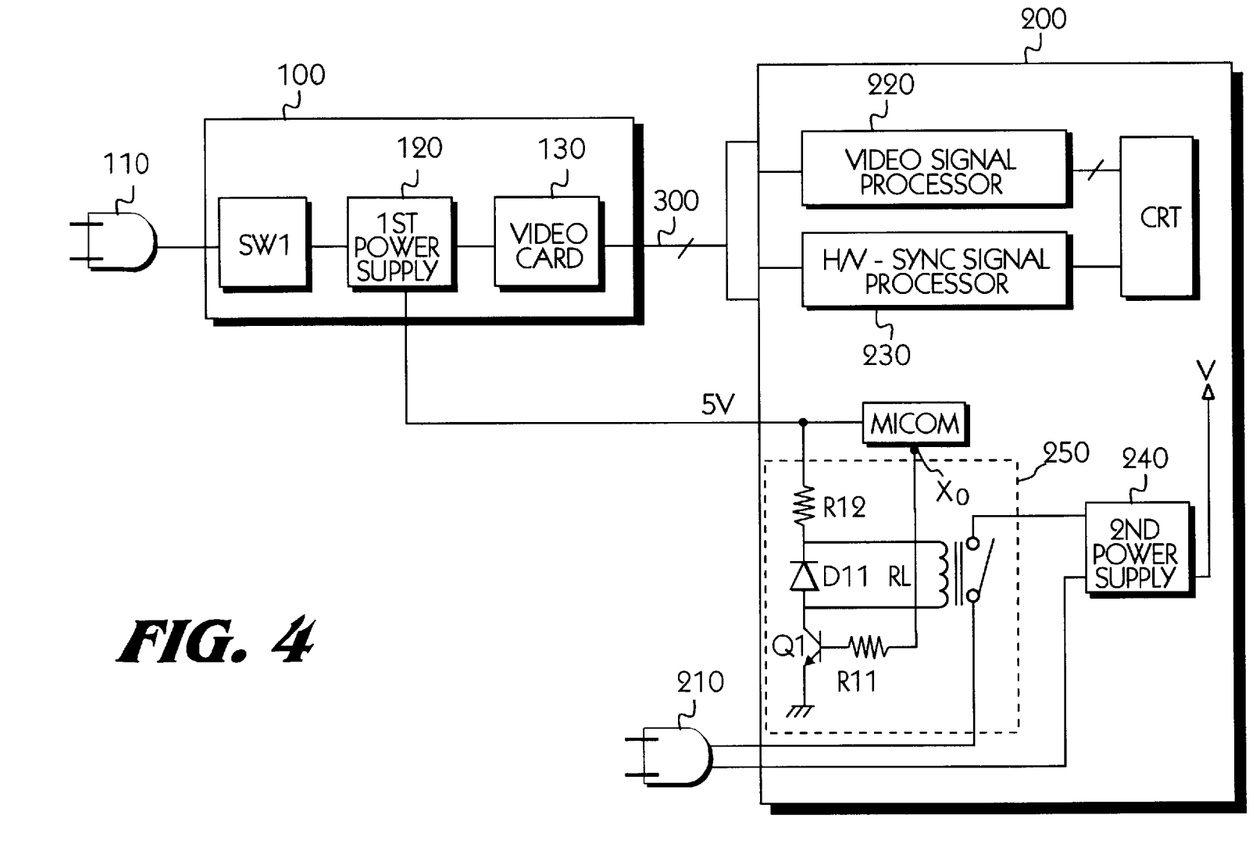
FIG. 4 illustrates a schematic block diagram of preferred embodiment of a power supply control apparatus for a computer peripheral equipment built according to the principles of the present invention.

Turning now to the drawings, a block diagram of overall power circuits for a computer system according to an embodiment of the present invention is illustrated in FIG. 4. The power circuit as illustrated in FIG. 4 exhibits a different circuit configuration as compared to one of exemplar of contemporary practice that was discussed in the above paragraphs. A switching device SW2, as illustrated commonly in FIGS. 1 and 2, which performs switching operation for current flow is not shown. Instead, the described switching device is replaced with a circuit portion comprising a microcomputer MICOM disposed to control power supplied from a power supply of a computer system and switching circuit 250 disposed to perform a switching operation responsive to a control signal input from the microcomputer MICOM. Switching circuit 250 comprises a resistor R11 for loading a control signal voltage output from a microcomputer MPU, a switching transistor Q11 having connected its base electrode to a terminal lead of resistor R11 and disposed to turn ON responsive to a control signal applied from the microcomputer a diode D11 connected to a collector arm of transistor 011 with its input terminal for protecting circuit operation, a resistor R12 for loading a voltage input and a relay RL whose terminals connected to both terminals of diode D11.

When powered on, a computer system initiates a booting operation and supplies to a microcomputer MICOM in a monitor a constant level of power supply via an electrical conduction path from a power supply 120. Upon applying a power supply, microcomputer MICOM produces a control signal Xo so as to turning on power circuit for monitor. Once an operation of computer system is suspended for a predetermined time interval, the computer system automatically shifts its operational mods into a power saving mode by executing a preset program. Upon shifting of an operational mods, microcomputer is prearranged to produce a signal indicating power saving mode.

When powered off, the computer system cuts off a power supply to microcomputer MICOM. As a result, relay RL in switching circuit 250 ceases its operation and in turn, power supplier 240 is no longer supplied with power. As previously noted, a power supply control process will be explained in more detail and in sequential order in conjunction with a circuit diagram according to one embodiment of the present invention, by way of non-limiting exemplar. When powered ON, a power supply is applied to and energizes various circuits in a computer system. Thus power supply 120 supplies power to microcomputer MPU in a monitor (or associated with the monitor and not necessarily in the monitor), and in turn, microcomputer generates a signal of high logic voltage level at its output terminal Xo. The signal voltage produced at output terminal Xo is applied to a base electrode of switching transistor Q1 via load resistor RI and turns it on, thereby establishing an electrical conduction path between collector and emitter electrodes thereof As a result, relay RL for switching is activated to cause power supplier 240 to be short-circuited and energized. Upon applying a signal representative of power saving operational mode from a computer system, microcomputer generates a signal of such mode thereby performing an operation of power saving mode in a monitor.

When powered off, microcomputer is prearranged to generates a signal of low logic voltage level at its output terminal Xo. As a result, switching transistor Q11 is turned off. This causes relay RL to be deenergized, cutting off power transmission from external power source to power supplier 240 in a monitor. As noted previously, without utilizing separate switching device power supply to a monitor is controlled by microcomputer according to power supply states or operational mode of a computer system.

Figure 5:
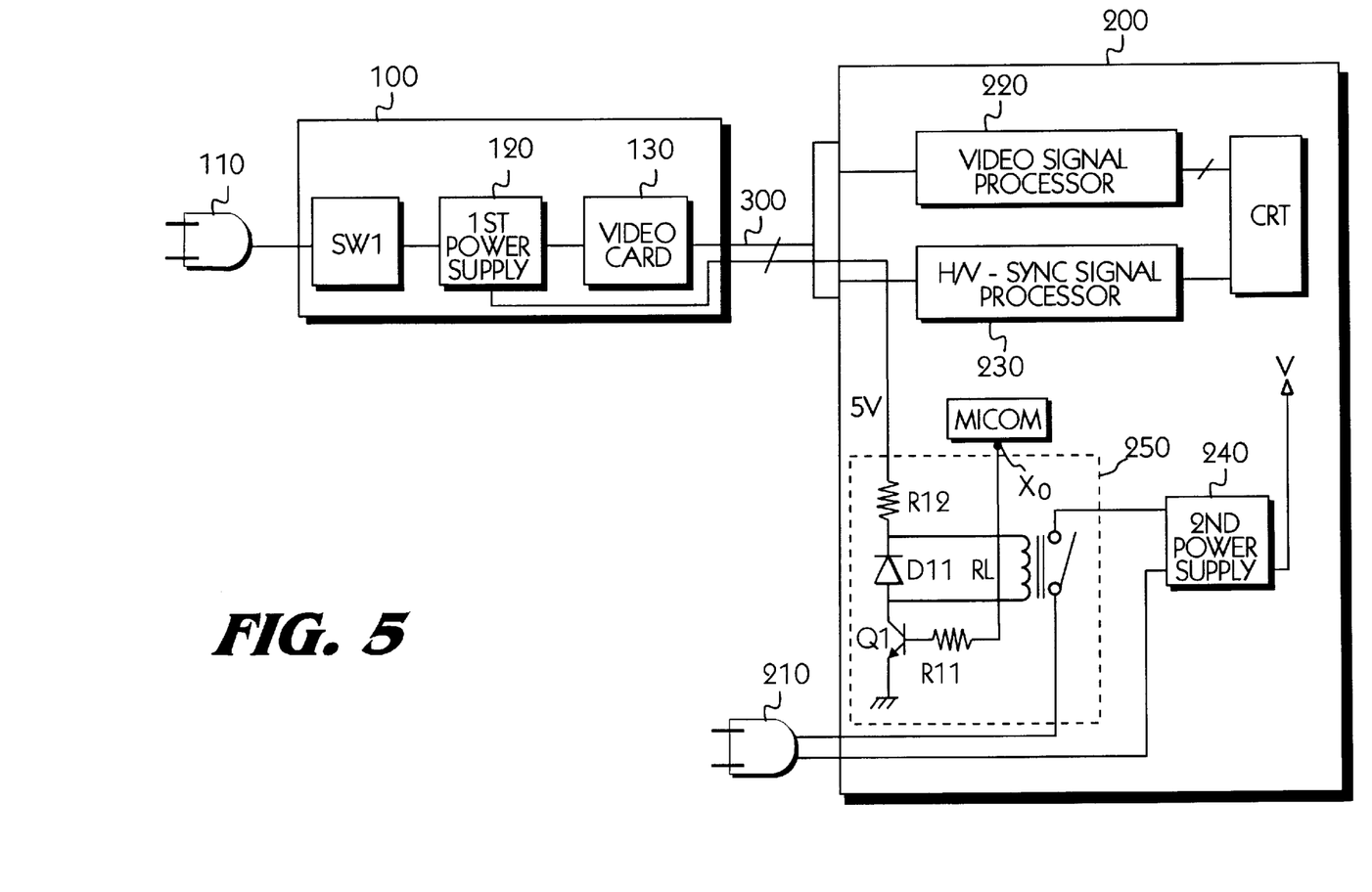
FIG. 5 illustrates a schematic block diagram of another preferred embodiment of a power supply control apparatus for a computer peripheral equipment built according to the principles of the present invention.

Another exemplar of power supply control circuit according to principles of the present invention is illustrated in FIG. 5. In the embodiment, a power supply control signal fed to microcomputer MICOM from power supply 120 in a computer system is transmitted via an open electrical conduction pin of signal cable 300. Besides using same signal cable 300 for transmission of control signal to microcomputer MICOM, the circuit construction is roughly similar to that of FIG. 4. By using a wire among others in signal cable 300 and applying a control signal of substantially 5 volts via the electrical conduction path thereof, an operation of conduction path thereof, an operation of power supply control for a monitor is carried out as well as various other operational functions.

Figure 6:
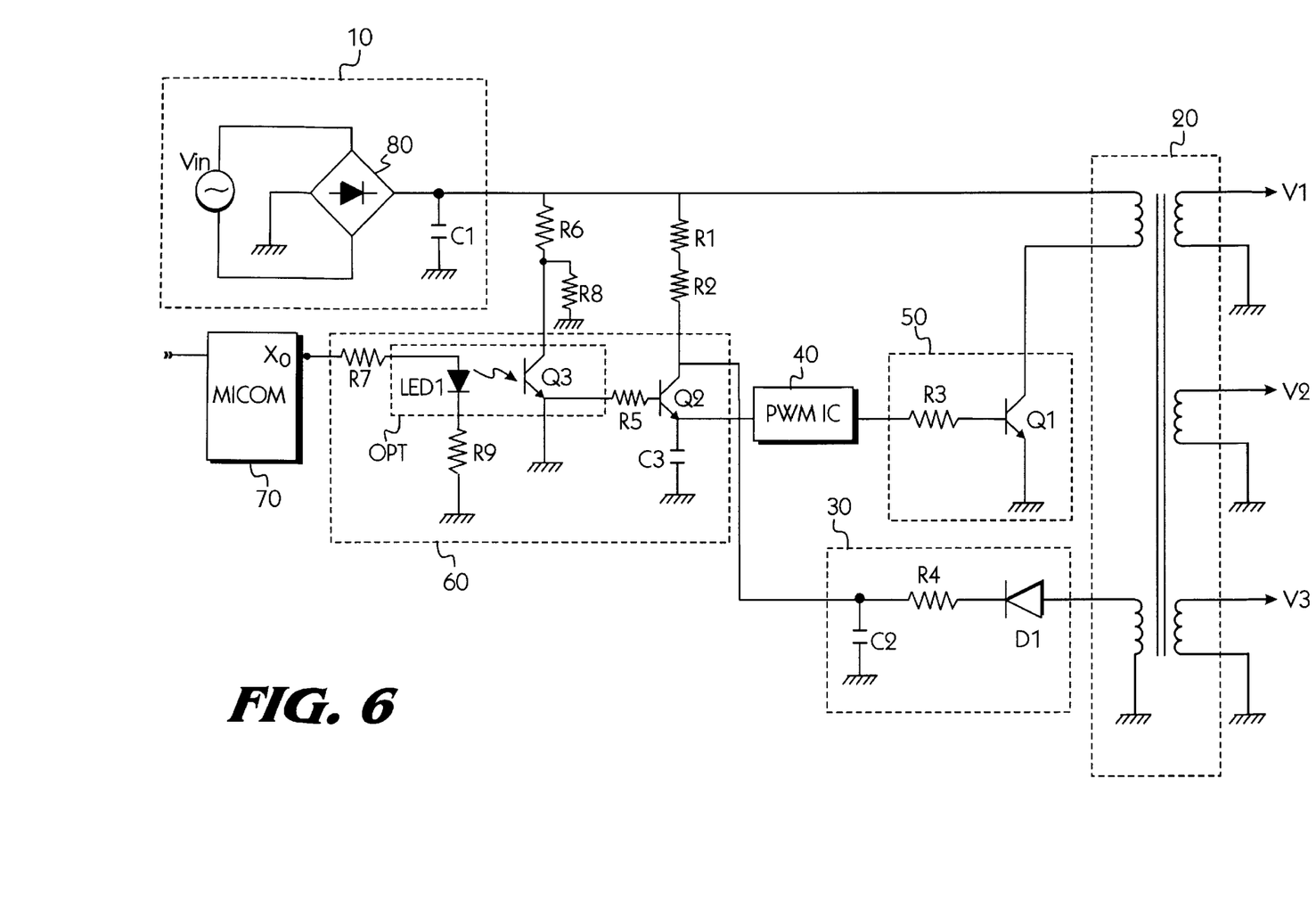
FIG. 6 is a detailed circuit diagram of a power circuit employed in a monitor of a preferred embodiment of the present invention.

Moving now on to FIG. 6, in which a detailed circuit diagram of a power supply control circuit for use with a monitor built according to the principles of the present invention is illustrated. The circuit comprises a rectifier circuit 10 comprised of a capacitor C1 and a bridge-type rectifier BID for rectifying alternating current AC voltage supply Vin at input terminals; a transformer 20 disposed to be supplied rectified voltage and to supply an induced voltage across secondary windings thereof; a transformer switching transistor 30 for electrical switching transformer 20; a pulse width modulation integrated circuit PWM-IC 40 for controlling a switching signal of transformer switching transistor 50; a driving circuit 30 for supplying an induced voltage output from transformer 20 to an input terminal of pulse width modulation integrated circuit PWM-IC to support a stable signal generating operation; a microcomputer MICOM for receiving a signal fed from a computer signal and producing a switching signal responsive to received signal; and a power control circuit 60 for switching current supply to an input terminal of pulse width modulation integrated circuit PWM-IC 40 in response to a signal output from microcomputer MICOM. Here, driving circuit 30 includes a diode D1 for rectifying an induced voltage supplied from transformer 20, a load resistor R4 and smoothing capacitor C2.

Power control circuit 60 includes a resistor R7 for loading a signal output from microcomputer MICOM across its terminal arms, a photocoupler OPT connected to resistor R7 and disposed to turn on and off in dependence upon a signal supplied thereto, a power supply control switching transistor Q2 having connected its base electrode to photocoupler OPT and its emitter terminal to an input terminal of pulse width modulation integrated circuit PWM-IC 30 and smoothing capacitor C3 connected between constant reference voltage and an emitter electrode of pulse width modulation integrated circuit PWM-IC 30. Photo coupler OPT comprises a light emitting diode LED 1, resistor R9 and photo-transistor 03 which is turned on and off responsive to luminescence operation of light emitting diode LED1. Photo transistor Q3 is fed with a rectified voltage input from rectifier circuit 10 at its collector electrode, which voltage being voltage divider, a pair of resistors R6 and R8. The phototransistor Q3 is used and may well be substituted with any other device of UMS electrical characteristic nature.

In operation, when no electrical conduction path is established between a computer system and a monitor, or otherwise, no power supply available as well as when powered off, microcomputer MPU is supplied with no power supply. As a result, microcomputer produces no signal output at its output terminal. Thus a potential level at its output terminal Is substantially at zero voltage level. Consequently, photocoupler OPT in power control circuit 60 does not operate and provides no operational source voltage Vcc at an input terminal of pulse width modulation integrated circuit PWM-IC 40.

When powered on, microcomputer is supplied with a driving power supply, substantially at 5 voltage level, via signal cable 300 from a computer system 100. Microcomputer generates a signal of high logic voltage level at its output terminal Xo during normal mode, turning on light emitting diode LED1 and thereby causing phototransistor Q3 to be electrically conducted. In turn, a bias potential applied at a base electrode establishes an electrically conducting channel thereby turning on power supply control switching transistor Q2. Upon applying a driving source voltage at an input terminal of pulse width modulation integrated circuit PWM-IC 40 subsequent to electrical conduction of power supply control switching transistor Q2. Transformer switching transistor Q1 whose base electrode connected to an output terminal of pulse width modulation integrated circuit PWM-IC 40 is in turn switched on thereby allowing transformer 20 to supply an induced voltage across a plurality of secondary windings for energizing various circuits in a monitor. As a result, a voltage is induced across secondary winding of transformer 20. A voltage induced among a plurality of secondary windings is again induced across one primary winding of transformer 20. Thus a voltage induced as explained above is rectified and smoothed by serially contacted diode D1 and capacitor C2. The voltage so rectified and smoothed is then fed to a collector electrode of power supply control switching transistor 02, thereby enabling stable operations of pulse width modulation integrated circuit PWM-IC 40 and overall power circuits.

When powered off, microcomputer MPU generates substantially equal to a zero potential level since no power supply is transmitted via signal cable 300. Consequently, photocoupler OPT and power supply control switching transistor Q2 become turned off, turning off an operation of pulse width modulation integrated circuit PWM-IC 40, thereby disabling power circuit in a monitor. Upon applying a display power management system DPMS signal from a computer signal which signal is a power off signal, power circuit for a normal operation is shifted into a power saving mode. Microcomputer MICOM generates a signal of low logic level so as to minimize overall power consumption for an operation of a monitor. On this occasion, microcomputer maintains normal status since a supply voltage of substantially 5 volts is still fed to an input terminal thereof via signal cable. However, a signal output from microcomputer is at a logic level of low, such that power circuit associated thereto becomes cut-off thereby allowing overall power consumption of a monitor to keep below 1 Watt.

When power saving mode release signal output from a computer system applied to a monitor in a power saving mode status, then microcomputer MPU generates a logic signal of high level, enabling pulse width modulation integrated circuit PWM-IC 40 and transformer 20. Thus a monitor is able to operate normally.

For easy reference and better understanding of an operation of power supply control circuit, a table is provides below as Table 1. The Table 1 represents an interrelation between a signal transmitted from a computer system and a reaction of a microcomputer in a monitor to the signal received.

TABLE 1

| SIGNAL STATUS FROM-COMPUTER | SIGNAL OUTPUT FROM-MICROCOMPUTER |
|---|---|
| PC ON | HIGH |
| Power Saving Mode Release | HIGH |
| Power Saving Mode | LOW |
| PC OFF | LOW |

As noted from Table 1, a method for controlling power supply comprises the steps of: enabling power circuits in a monitor in response to a signal of high logic level output from a microcomputer when a signal status transmitted from a computer system indicates a power supply signal ON; allowing a microcomputer to maintain Stand-By state and turning off other power circuits but the microcomputer while an operational mode of the computer system shifts from normal mode to power saving mode; releasing power saving mode and shifting to normal mode in a monitor in respond to a signal of high logic level output from a microcomputer, upon applying power saving mode release signal output from the computer system; and shutting down power supply to power circuits in a monitor when powered off in the computer system.

As previously noted, power supply control circuit and method for use with a computer peripheral equipment according to the principles of the present invention enables a microcomputer to perform a switching operation of power circuit in dependence upon power saving mode status and release thereof as well as a power switching operation of a computer system thereby controlling power supply to the equipment without using a separate switching device. In addition, computer peripheral equipment is able to operate at a minimum power consumption in response to a power saving mode signal input from the computer system, leading to power saving thereby enhancing product efficiency. Further, by eliminating the need for a separate switching device, aesthetic visual appearance of a computer peripheral equipment is enhanced and manufacturing process is more simplified thereby enabling production efficiency, at a low cost.

For the sake of brevity, a detailed explanation of a preferred embodiment of the present invention refers to one example among many possible examples: use of a monitor among computer peripheral devices, a power supply control signal will be assumed to be applied to a monitor from a computer system associated therewith via an electrical conduction path for allowing current flow in a signal cable. A monitor is one of a display apparatus for visually display an image on the screen thereof for user interface, and is also a representative of peripheral devices that are associated to a computer synchronizing. It is however understood that any peripheral device may be used as an example in the explanation purposes instead of a monitor. Therefore, power supply control circuit according to the present invention may be characterized in that a signal for energizing or enervating overall operations of various circuits in a monitor is produced in response to the status of a signal input from a computer system, i.e., whether the system is powered on or off. The circuit above also produces a power supply control signal upon execution of a power saving mode.

While there have been illustrated and described what are considered to be embodiments of the present invention, it will be understood by those skilled in the art that various changes and modifications may be make, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments failing within the scope of the appended claims.

What is claimed is:

1. A peripheral equipment of a computer system, comprising:
   a signal cable electrically connected to said computer system for receiving a video signal reflecting an image and power supply from said computer system;
   a microcomputer electrically coupled to receive the power supply from said computer system via said signal cable for generating a power control signal to control power supply of said peripheral equipment in dependence of a power supply status of said computer system; and
   a switching circuit disposed to electrically switch the power supply from said computer system responsive to said power control signal, said switching circuit comprising:
      a first resistor for loading said power control signal from said microcomputer;
      a switching transistor having a base electrode connected to said first resistor and disposed to turn on in response to said power control signal from said microcomputer, and a collector electrode coupled to receive the power supply from said computer system via a diode and a second resistor; and
      a relay having relay terminals connected to both input and output terminals of said diode.

2. The peripheral equipment of claim 1, further comprised of said switching circuit utilizing said microcomputer to perform switching operations for supplying power to said peripheral equipment.

3. A peripheral equipment comprising:
   means for receiving a power signal reflecting a power supply status of said computer system through a signal cable;
   a switching circuit for switching to provide power supply from a power supply source for automatic operation of said peripheral equipment;
   a microcomputer for generating a power control signal in response to said power signal reflecting said power supply status of said computer system via said signal cable; and
   a power control circuit for controlling switching operations of said switching circuit to provide the power supply for automatic operation of said peripheral equipment in response to said power control signal said power control circuit comprising:
      a first resistor for loading said power control signal from said microcomputer,
      a photocoupler connected to said first resistor and disposed to turn on and off in dependence upon said power control signal supplied thereto;

a second resistor connected to said photocoupler; and
a transistor having a base electrode connected to said to photocoupler via said second resistor and having conducting electrodes disposed between a reference voltage terminal of said power supply source and a ground terminal.

4. The peripheral equipment of claim 3, wherein said photocoupler comprises:
a light emitting diode;
a third resistor; and
a phototransistor turning on and off in response to luminescence of operation of said light emitting diode.

5. The peripheral equipment of claim 3, further comprised of said microcomputer further:
enabling all power circuits of said peripheral equipment when said power control signal reflecting the power supply status from said computer system indicates a power supply signal as being at ON level;
allowing said peripheral equipment to maintain at a stand-by state and turning off circuits other than power circuits while an operational mode of the computer system shifts from a normal state mode to a power saving state mode;
releasing said peripheral equipment from said power saving state mode and to said normal state mode in response to receipt of a power saving mode release signal output from the computer system; and
shutting down power supply to the power circuits of said peripheral equipment when said computer system is powered off.

6. A peripheral equipment of a computer system comprising:
means for receiving a power signal reflecting a power supply status of said computer system through a signal cable;
a switching circuit for switching to provide power supply from a power supply source for automatic operation of said peripheral equipment;
a microcomputer for generating a power control signal in response to said power signal reflecting said power supply status of said computer system via said signal cable;
a power control circuit for controlling switching operations of said switching circuit to provide the power supply for automatic operation of said peripheral equipment in response to said power control signal; and
said switching circuit comprising:
a first resistor loading said power control signal output from said microcomputer;
a switching transistor having a base electrode connected to said first resistor and principally electrical conduction electrodes respectively connected to receive said power signal reflecting a power supply status of said computer system via a diode and a second resistor, said switching transistor disposed to turn on in response to said power control signal applied from said microcomputer; and
a relay having relay terminals connected to both input and output terminals of said diode.

7. The peripheral equipment of claim 6, further comprised of said signal cable having a plurality of electrically conductive pins for conveying said power signal reflecting the power supply status of said computer system differently from said video signal reflecting an image for a visual display.

8. The peripheral equipment of claim 7, further comprised of said microcomputer receiving a computer system signal produced from said computer system via said signal cable and subject to individual states of a display power management system employed in said computer system for generating a second control signal to an input terminal of said switching circuit.

9. The peripheral equipment of claim 8, further comprised of said switching circuit utilizing said microcomputer to perform switching operations for supplying power.

10. The peripheral equipment of claim 7, further comprised of said switching circuit utilizing said microcomputer to perform switching operations for supplying power.

11. A computer system, comprising:
a main unit including at least a central processing unit for operation, a power supply source providing power supply, a power switch operable to provide the power supply for operation, and a video card providing a power signal reflecting an electrical power status of said main unit by indicating whether electrical power is being applied to said main unit and providing a composite video signal including a video signal and synchronization signals for a visual display;
a display unit electrically connected to said main unit, via a signal cable, receiving said power signal from said main unit, via said signal cable, to enable automatic operation of said display unit, and receiving said composite video signal from said main unit, via said signal cable, to enable said visual display of an image, said display unit comprising:
a signal connector connected to said signal cable and providing said power signal for allowing the display unit to automatically shut down when the main unit is manually shut down, and allowing power to be applied to the display unit automatically when power is supplied manually to the main unit, and providing said composite video signal for said visual display of an image;
a microcomputer generating a power control signal in response to said power signal provided from said signal connector reflecting said electrical power status of said main unit; and
a switching circuit disposed between said signal connector and said microcomputer for switching allowing the display unit to automatically shut down when the main unit is manually shut down, and allowing power to be applied to the display unit automatically when power is supplied manually to the main unit in response to said power control signal by automatically applying and automatically interrupting provision of the electrical power to said display unit in dependence upon said power control signal.

12. The computer system of claim 11, further comprised of said power signal corresponding to five (5) volts for enabling switching operations of said switching circuit to provide power supply for operation of said display unit.

13. The computer system of claim 11, further comprised of said display unit remaining powered off when said power signal is not applied, via said signal cable, from said main unit.

14. The computer system of claim 11, further comprised of said display unit automatically operating in response to said power signal without the necessity of a manually operated power switch.

15. The computer system of claim 11, further comprised of said display unit including a power supply source for providing said power supply for operation in response to said power signal from said main unit.

* * * * *